P. P. B. BROOKS.
CUTTING AND PRUNING TOOL.
APPLICATION FILED JAN. 22, 1909.
958,587.
Patented May 17, 1910.
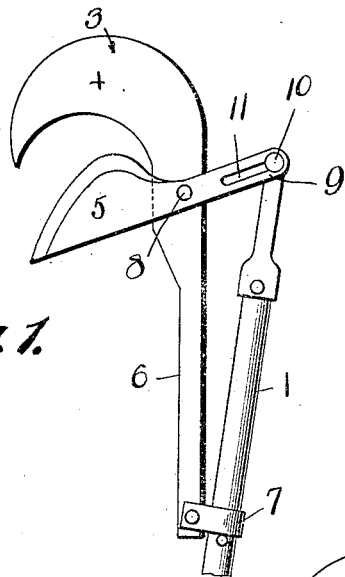
Fig. 1.
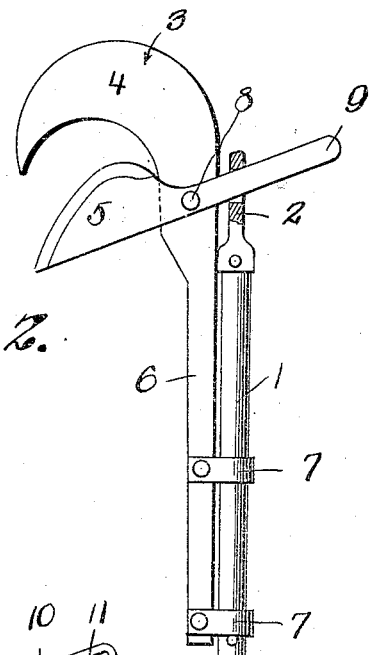
Fig. 2.
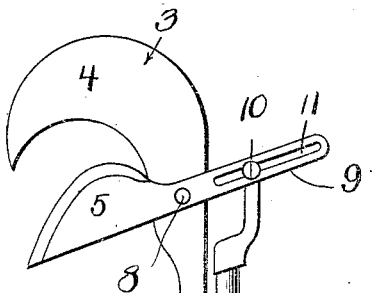
Fig. 3.
Witnesses
Chas. L. Richardson.
Wm. J. Koerth.
Inventor
Paul P. B. Brooks,
By Victor J. Evans
Attorney
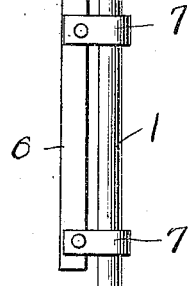
ANDREW B. GRAHAM CO., PHOTO-LITHOGRAPHERS, WASHINGTON, D. C.

UNITED STATES PATENT OFFICE.

PAUL P. B. BROOKS, OF KENT TOWNSHIP, WARREN COUNTY, INDIANA.

CUTTING AND PRUNING TOOL.

958,587. Specification of Letters Patent. Patented May 17, 1910.

Application filed January 22, 1909. Serial No. 473,737.

*To all whom it may concern:*

Be it known that I, PAUL P. B. BROOKS, a citizen of the United States of America, residing at Kent township, in the county of Warren and State of Indiana, have invented new and useful Improvements in Cutting and Pruning Tools, of which the following is a specification.

This invention relates to a cutting and pruning tool, and the object of the invention is to provide a device of this character which is extremely simple in construction, comparatively cheap to manufacture and which will perform the functions for which it is intended with certainty and efficiency.

With the above objects in view, and others which will appear as the description progresses, the invention resides in the novel arrangement and combination of parts hereinafter fully described and claimed.

In the accompanying drawings there has been illustrated a simple and preferred embodiment of the invention and in which:

Figure 1 is a side elevation of a device constructed in accordance with the present invention. Fig. 2 is a similar view illustrating the modification. Fig. 3 is a view illustrating a still further modification.

In the accompanying drawing the numeral 1 designates the operating handle of the device. This handle 1 is preferably rounded in cross section and is of a length sufficient for elevating the cutting and pruning tool to a sufficient height to sever the limbs or branches of the tree to be pruned. The handle 1 has its upper extremity provided with a suitable eye 2, the purpose of which will hereinafter be apparent. The numeral 3 designates the cutting or pruning device. This device comprises a pair of cutting members 4 and 5. The member 4 has its under surface concaved or hooked and is provided with a reduced depending arm 6. The arm 6 is provided with a pair of collars 7 positioned a suitable distance apart and adapted to engage the cross sectional rounded handle 1. The curved under surface of the hook 4 is sharpened so as to provide a cutting edge, and the cutting member or knife 5 is pivotally secured to the arm 6 of the member 4 as indicated by the numeral 8. The knife member 5 has its cutting face extending directly below the cutting face or edge of the member 4, and this portion of the knife member 5 is enlarged so as to provide a weighted portion which normally falls downwardly and away from the cutting edge of the hook member 4. The weighted surface of the knife 5, it is to be understood, is at all times sufficient to overbalance the projecting arm 9 and allows the jaws of the cutting member of the tool to be normally retained in their open position. It will be noted that the operating handle 1 is provided with a projecting pin 10 which is adapted to limit the downward movement of the arm 6 of the hook member 4. The arm 9 may be provided with an elongated slot 11 which is adapted to be engaged by the extremity of the arm 1.

From the above description, taken in connection with the accompanying drawing, it will be noted that I have provided an extremely simple and effective device for the purpose set forth, one wherein the cutting jaws are so arranged as to provide a shearing or gliding motion when severing the branch or limb of a tree, one wherein the cutting elements are so arranged as to be normally retained in an open position, and one which may be constructed at a comparatively low cost.

Having thus fully described the invention what is claimed as new is:

The combination with an operating handle having its extremity provided with a slotted extension, of a hook member provided with spaced collars engaging the operating handle, of a knife member having an extending portion, said knife member being pivotally connected with the hook member and having its extending portion projecting through the slotted extension of the operating handle.

In testimony whereof I affix my signature in presence of two witnesses.

PAUL P. B. BROOKS.

Witnesses:
W. R. BRUNSFIELD,
J. T. HANBERY.